(12) United States Patent
Vasanth et al.

(10) Patent No.: US 9,438,665 B1
(45) Date of Patent: Sep. 6, 2016

(54) SCHEDULING AND TRACKING CONTROL PLANE OPERATIONS FOR DISTRIBUTED STORAGE SYSTEMS

(71) Applicant: Amazon Technologies, Inc., Reno, NV (US)

(72) Inventors: Jai Vasanth, Seattle, WA (US); Kiran-Kumar Muniswamy-Reddy, Seattle, WA (US); David Alan Lutz, Renton, WA (US); Barry Bailey Hunter, Jr., Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 566 days.

(21) Appl. No.: 13/921,084

(22) Filed: Jun. 18, 2013

(51) Int. Cl.
*G06F 15/173* (2006.01)
*H04L 29/08* (2006.01)

(52) U.S. Cl.
CPC .................... *H04L 67/10* (2013.01)

(58) Field of Classification Search
CPC ............... H04L 12/24; H04L 12/4645; H04L 12/6418; H04L 2012/6486; H04L 41/00; H04L 67/1097; H04L 69/324; G06F 17/5045; G06F 9/45533; G06F 9/45537; G06F 9/4887
See application file for complete search history.

(56) References Cited

U.S. PATENT DOCUMENTS

| | | | |
|---|---|---|---|
| 7,200,865 B1 * | 4/2007 | Roscoe | H04L 63/104 726/12 |
| 8,364,892 B2 | 1/2013 | Hluchyj et al. | |
| 2007/0110025 A1 * | 5/2007 | Guichard | H04L 63/0272 370/351 |
| 2008/0049621 A1 * | 2/2008 | McGuire | H04L 12/24 370/236.2 |
| 2012/0084443 A1 * | 4/2012 | Theimer | G06F 9/45533 709/226 |
| 2012/0124282 A1 | 5/2012 | Frank et al. | |
| 2013/0114409 A1 * | 5/2013 | Iovanna | H04L 45/02 370/235 |
| 2013/0159548 A1 * | 6/2013 | Vasseur | H04L 45/125 709/239 |
| 2013/0201826 A1 * | 8/2013 | Testa | H04L 47/10 370/230 |

FOREIGN PATENT DOCUMENTS

| WO | 2010006132 | 1/2010 |
|---|---|---|
| WO | 2012010219 | 1/2012 |
| WO | 2013079093 | 6/2013 |

* cited by examiner

*Primary Examiner* — Benjamin M Thieu
(74) *Attorney, Agent, or Firm* — Robert C. Kowert; Meyertons, Hood, Kivlin, Kowert & Goetzel, P.C.

(57) ABSTRACT

A system that implements distributed storage may schedule and track control plane operations for performance at the distributed storage service. Information may be maintained for control plane events detected at a distributed storage system. Resource utilization for currently performing control plane operations and currently scheduled control plane operations of the distributed storage system may be determined. The information about detected control plane events may be analyzed to schedule control plane operations to be performed in response to detecting the control plane events. As part of scheduling control plane operations, resource constraints may be applied to the determine resource utilization for the distributed storage system.

22 Claims, 8 Drawing Sheets

SCHEDULING AND TRACKING CONTROL PLANE OPERATIONS FOR DISTRIBUTED STORAGE SYSTEMS

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. Various different operations may be performed among the machines of a distributed database system in order to maintain the health of user data. These different operations may be performed as result of different events. If a partition of user data gets too large, for example, it may be split into smaller partitions (each stored on a different machine) or moved to another machine. Other events related to interactions between client applications and database servers, such as read operations (read-only queries), write operations (to store data), and update operations, may trigger different operations to be performed. Conflicting priorities, resource restraints, and other constraints of the operations performed in response to these varying events, however, may over-burden or reduce a distributed database system's performance.

Figure 1:
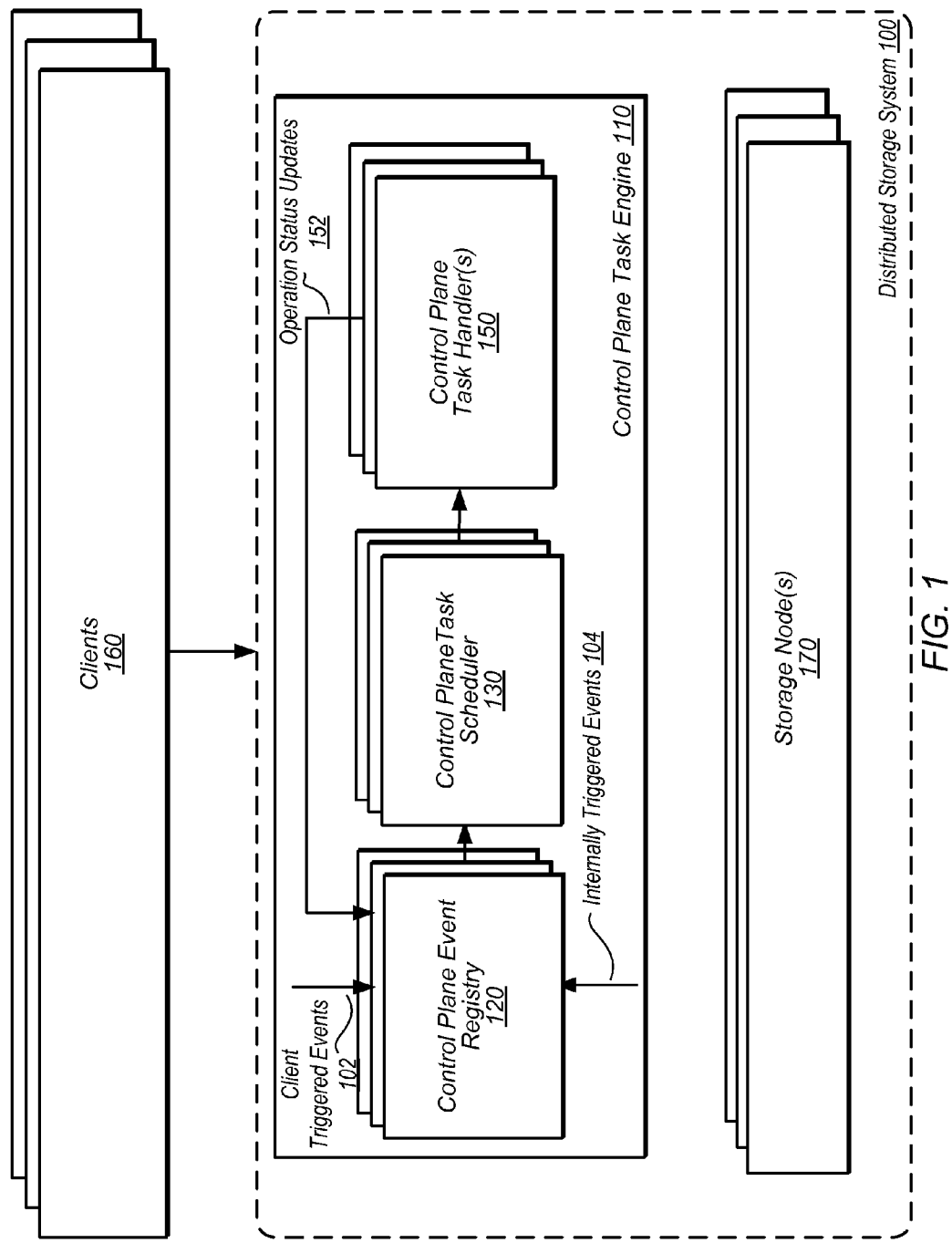
FIG. 1 is a block diagram illustrating a task engine configured to schedule and track control plane operations for a distributed storage service, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement scheduling and tracking of control plane operations for a distributed data storage service. Distributed systems, such as distributed storage services, typically perform a variety of different operations, often directed by a control plane (or some other system-wide or global control system) among one or more nodes or computing devices implementing the distributed system. These operations, referred to herein as control plane operations, are often performed in response to or in accordance with a control plane event that is detected at/by the distributed system. Depending on the services or tasks performed by the distributed system, an assortment of different control plane events may be detected. For instance, in a distributed storage service, different reliability or durability guarantees for stored data may employ data reconfiguration or replication events in order to sufficiently maintain data. As different types of control plane operations performed may utilize different resources, control plane operations for detected control plane events may be scheduled so that performance of the control plane operations corresponding to detected control plane events may be performed with various resource constraints in mind. Additional information may be maintained for operations being performed that tracks the progress or status of control plane operations. In the event of a system failure, the control plane operation may be completed without necessarily starting at the beginning.

This specification begins with a general description of scheduling and tracking control plane operations for a distributed storage service. Then various examples of a distributed storage service are discussed, including different components/modules, or arrangements of components/module, that may be employed as part of implementing a distributed storage service. A number of different methods and techniques to schedule and track control plane operations for a distributed storage service are then discussed, some of which are illustrated in accompanying flowcharts. Finally, a description of an example computing system upon which the various components, modules, systems, devices, and/or nodes may be implemented is provided. Various examples are provided throughout the specification.

As noted above, scheduling and tracking control plane operations for a distributed storage service may be implemented in different ways. FIG. 1, for instance, is a block diagram illustrating a task engine configured to schedule and track control plane operations for a distributed storage service, according to some embodiments. Information about detected control plane events, such as client triggered events 102 and internally triggered events 104, are maintained at control plane event registry 120. Control plane task scheduler 130, or some other component, determines current resource utilization for currently performing control plane operations, such as various control plane operations being performed among storage nodes 170, and currently scheduled control plane operations of distributed storage system 100. Control plane task scheduler 130 may then analyze the information maintained about the detected control plane events to schedule control plane operations for performance. Control plane task scheduler 130 may apply various different prioritization schemes and techniques to schedule control plane operations. In some embodiments, one or more resource constraints may be applied to the determined current resource utilization for distributed storage system 100 in order to schedule the control plane operations. Control plane task scheduler 130 may then direct one or more task handlers 150 perform the scheduled control plane operations. During the performance of control plane operations' progress or status updates may be sent from task handlers 150 to control plane event registry 120, or to some other component or module to be maintained. In the event of a system or other failure affecting control plane operations, task scheduler 130 may employ the status or progress information for incomplete control plane operations to direct the completion of control plane operations by task handlers 150.

In some embodiments, events, and their corresponding operations, may be classified in several ways. In FIG. 1, for example, client triggered events 102 may be triggered by one or more client requests for the performance of one or more operations or services by distributed storage system 100. Client triggered events may be more generally, any events that are triggered external to the distributed storage system 100, implementing control plane task engine 110. Consider the scenario where a distributed storage service provides clients 160 with various capabilities for storing, accessing, and managing data. A table, or some other data object may be maintained for a client 160 at the distributed storage service. The distributed storage service may receive a request from a client to divide the table into multiple different partitions. Thus, a trigger for the partition event is external to the distributed system. Other types of requests, commands, or messages from a client triggered events, as well as other non-client systems or devices. For instance, a network-based services platform, such as network-based services platform 200 discussed below with regard to FIG. 2, may be an external source triggering events for distributed storage system 100.

Another example classification of events is internally triggered events 104. Internally triggered events 104 may, in some embodiments, be events that are triggered by one or more internal components, systems, devices, modules, or nodes of a distributed system. For example, distributed storage system 100 may include one or more sweeper modules (not illustrated) that detect the current state of various resources, data configurations, or other system components or attributes. If a particular resource, for instance, falls below a particular threshold, or is out of line with some prescribed definition of a healthy state for the particular resource, then a sweeper module or monitor may trigger an event with a corresponding operation to correct the identified deficiency. In the case of a distributed storage service, for instance, a sweeper module may detect that a number of replicas of a particular partition of a data object is insufficient to meet durability requirements for the data object, triggering an internal event for the distributed system. Many other types or sources of internally triggered events may be envisioned. For example, node clusters, or leaders of node clusters storing data for a distributed storage system may, in some embodiments, request the performance of control plane operations, triggering events for the distributed storage system.

Moreover, event triggers may also be classified in a variety of other different ways. Dynamically triggered events, such as those that spontaneously occur, or schedule triggered events, such as those that events that are triggered according to a pre-determined time, location, or instruction, may be also detected and/or classified. Different classifications may be applied to the same event. In some embodiments, for example, a client or internal system component may schedule a certain event periodically, thus the event may be triggered internally and scheduled, or externally and scheduled. Therefore, the previous examples of different ways of classifying event triggers are not intended to be limiting.

Other classifications for control plane events, and their corresponding control plane operations, may involve the type of operation to be performed in accordance with the detection of the control plane event. The particular services offered or tasks performed by a distributed system may offer further distinctions to be made on different types of operations to be performed. For example, in some embodiments, a distributed storage service may perform a plurality of different operations, which may be classified into a plurality of different operation types. Some examples of different operation types for a distributed storage service include, but are not limited to, reboot operations, split or partition operations, move operations, add replica operations, create table operations, delete table operations, and/or update table operations. More generally, control plane operations may be any type of operation that relies upon the coordination of a control plane (or other system-wide or global control module) to be performed. Different operation types may include a number of different sub-tasks, steps, or elements to be completed as part of the particular operation type.

Figure 2:
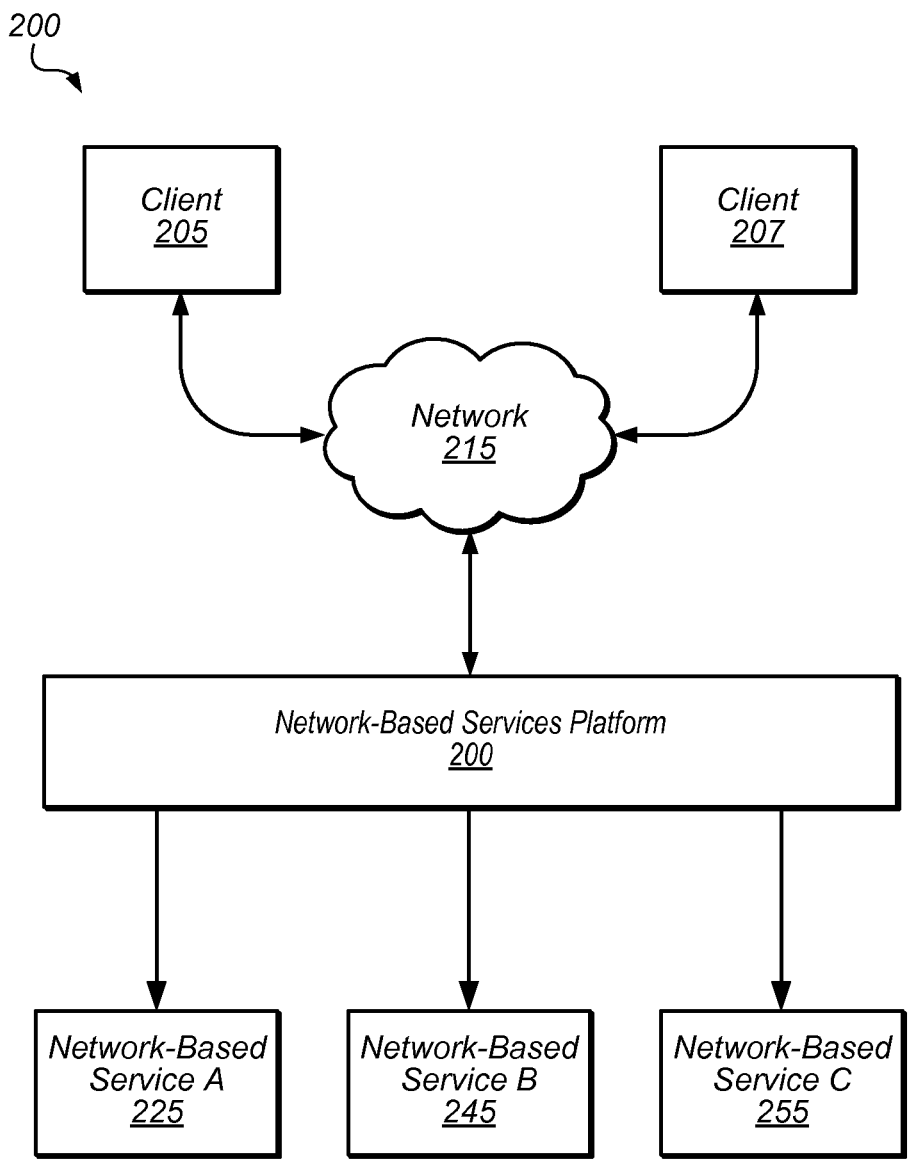
FIG. 2 is a block diagram illustrating of an operating environment for network-based services, according to some embodiments.
Figure 3:
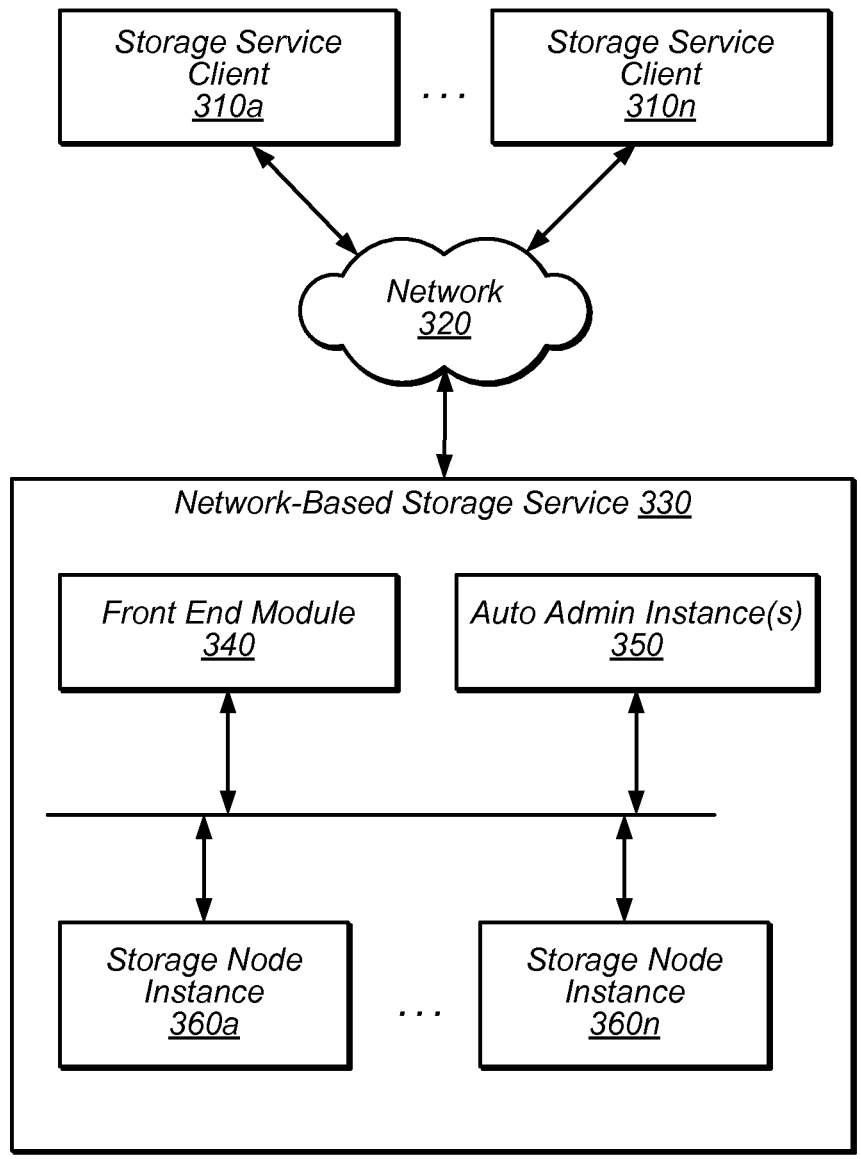
FIG. 3 is a block diagram illustrating a distributed storage service, according to some embodiments.

A control plane task engine 110, or some other similar module or component, may be implemented by a variety of different distributed systems in order to implement scheduling and tracking of event operations for a distributed storage service. A control plane task engine 110 may be implemented by one or more computing devices, systems, or nodes, and be configured to communicate with other modules, subsystems, components, or clients. Different combinations of hardware and/or software may be included to provide the various functionalities described. For instance, control plane task engine 110 may be a part of a virtual instance of a node for a distributed system or a dedicated computing device with specialized components. Diverse implementations or configurations of distributed systems, such as different types of distributed storage services, may implement control plane task engine 110. As illustrated in FIG. 1, control plane task engine 110 is implemented by distributed storage system 110, which may employ various different devices and techniques to implement a distributed storage system. FIGS. 2-4 provide various examples of a distributed storage system or service and are discussed in further detail below.

A control plane task engine 110 may include an event registry 120, or some form of data structure or store for information about detected events. Externally triggered events 102 and internally triggered events 104 may be registered at event registry 120, such as by sending one or more registration messages to control plane task engine 110. In some embodiments, control plane event registry 120 may be an interface or other module that communicates or interacts with storage for event registration messages or other information about events detected at distributed system 100. For example, control plane event registry 120 may provide access to a database table that records detected control plane events for distributed storage system 100. Thus, in some embodiments, control plane event registry 120 may be distributed across multiple systems to provide access to data which, like the database table example above, may also be distributed across multiple nodes/devices of distributed storage system 100. Alternatively, in some embodiments, control plane event registry 120 may be a data store or other system or device that allows for data to be accessed, or addressed by one or more other systems or devices. As many different architectures or embodiments of implementing a control plane task registry may be envisioned, the previous examples are not intended to be limiting.

Information maintained by control plane event registry 120 may be organized or structured in a variety of different ways. Different metadata or other information about detected events, such as the trigger of a detected control plane event (e.g., internal or external), type of operation to be performed in response to or in accordance with the detected control plane event may be maintained. More generally, control plane event registry 120 may include information related to the detected events, such as a timestamp when events are registered. The progress or status of detected events may also be tracked/maintained in control plane event registry 120, as well as the resources currently being utilized, the various decisions or analyses (as well as the results) for steps of the operation performed, or the various resources allocated for performing operations for the detected events. For instance, in at least some embodiments, control plane event registry 120 may include an indicator for each detected event that indicates the current state of the corresponding operation for the detected event, such as "pending," "active," "failed," "cancelled," or "done." The event registry may identify particular locations, components, or systems to perform the operations corresponding to the detected events. If various decisions were made as part of the operation, such as whether to move a partition from one node to another, the event registry may also reflect this information. Entries or information about detected events with completed operations may, in various embodiments, be removed from control plane event registry 120.

Control plane task engine 110 may also include control plane task scheduler 130, in various embodiments. Control plane task scheduler 130 may be implemented across one or more nodes, systems, or devices. For instance, various instances of auto-admin instance 350 may be used to perform task scheduling for control plane operations. Alternatively, in another example, one auto-admin instance may perform scheduling operations and direct various deputy instances to carry out the scheduled control plane operations.

Control plane task scheduler 130 may be configured to determine current resource utilization for control plane operations currently being performed and/or control plane operations currently scheduled. For instance, control plane task scheduler 130 may determine that different task handlers configured or assigned to perform different control plane operations have a certain number of slots occupied by performing control plane operations (as well as a certain number of empty slots ready for performing control plane operations) allowing control plane task scheduler 130 to apply a throttle or other limitation to the number of control plane operations of the same or similar operation types. Various other techniques may be performed to obtain and determine current resource utilization. Resource utilization may also, for example, identify the various resources performing control plane operations, as well as various performance attributes or values that describe how a particular resource is utilized. For example, in many embodiments storage nodes 170, or other nodes, systems or devices of a distributed system, may be concurrently interacting with and performing various tasks with other nodes. Different storage nodes 170, for instance, may maintain a replica group of data, while some of those same nodes may maintain data for other replica groups or arrangements with different nodes. In this example scenario, the variety of different interactions, as well as configurations, may be described in resource utilization data. For instance, the location of various data objects, their size, metadata (such as how often they are accessed, etc.,) may be a part of current resource utilization information. Similarly, the various logical arrangements, such as replica groups, or roles of particular nodes, such as master nodes for a particular replica group, may be also included as part of current resource utilization information. Various other information, such as network load, computing/processing resources, available memory, etc. may be evaluated when determining the current resource utilization for distributed system analyze information about detected events maintained at event registry 120. In some embodiments, current resource utilization may provide a global or near-global view of the current state of various different components, devices, modules, or nodes of a system, such as the operations they are performing and/or the data they are maintaining.

In various embodiments, control plane task scheduler 130 may then analyze the information maintained for the plurality of detected events in control plane event registry 120 to schedule control plane operations to be performed. This analysis may examine the various information maintained for the different events, such as the event trigger, operation type, resources to be utilized, etc. As part of the analysis, in some embodiments, one or more resource constraints may be applied to the determined current resource utilization. Applying resource constraints may allow control plane task scheduler 130 to schedule control plane operations without exceeding specific resource constraints for operations. For example, in some embodiments, nodes may be limited to a particular number of import and/or export operations, that is, only a certain amount of information may be transferred in or transferred out of a node at a given time. If current resource utilization indicates that a particular node already has a certain number of operations or amount of data for import/export being performed, then it may be that only the remaining import/export capacity may be currently used by a control plane operation. If a detected control plane event involves performing an import or export operation upon this particular node that exceeds the available capacity, then control plane task scheduler 130 may delay the scheduling of the particular control plane operation until such a time that the node has capacity to perform the operation. Various other types of operations, as well as resource constraints, such as conflicts or throttling limits, are discussed below with regard to FIGS. 4 through 6, and as such the following example is not intended to be limiting. Various resources for performing control plane operations, such as available storage, bandwidth, processing power, system limitations (such as a global limit on operations of particular type), etc. may also be resource constraints applied to current resource utilization when scheduling control plane operations.

Control plane task handlers 150 may be directed by control plane task scheduler 130 to perform control plane operations scheduled by control plane task scheduler 130. Control plane task handlers 150 may be implemented across one or more nodes, systems, or devices, such as multiple different auto-admin instances 350 described below with regard to FIG. 4. Control plane task handlers 150 may also send or provide operation status updates 152 on the progress, status, or performance of operations, which may be maintained in event registry 120, as illustrated, or in some other data store maintaining operation status information. Control plane task handlers 150 that fail to complete the performance of operations, such as due to system failure or other interruption, may be directed to complete operations based on this maintained update information for operations corresponding to events. A determination may be made as to the last saved progress of the operation, and control plane task handlers 150 may be configured to complete performance at a point in the operation nearest to the point of last saved progress.

Figure 4A:
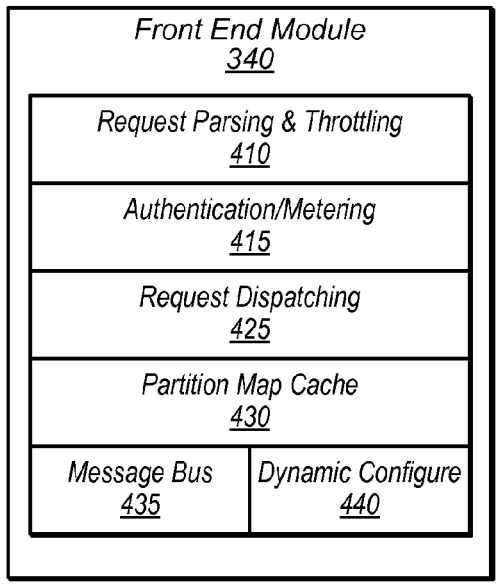
FIGS. 4A-4C are block diagrams illustrating various components of a distributed storage service, according to some embodiments.
Figure 4B:
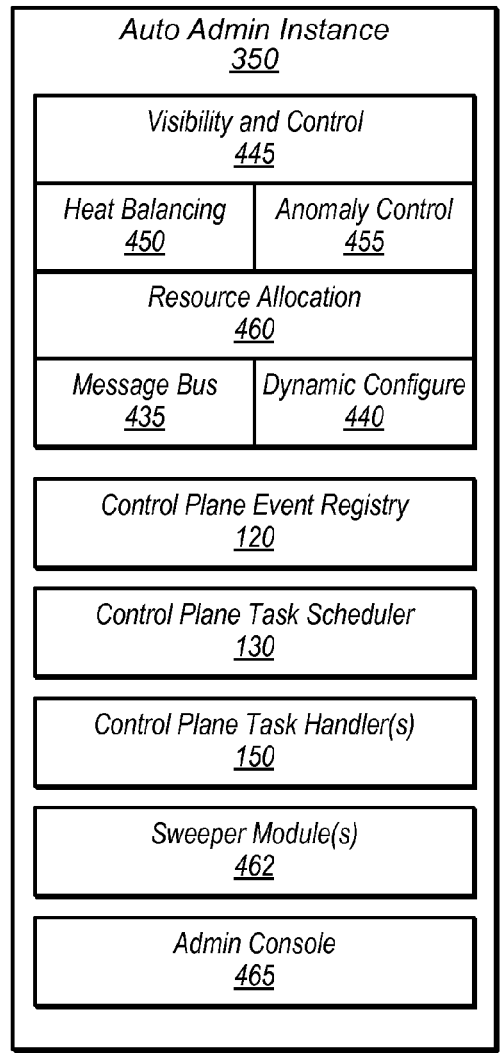
Figure 4C:
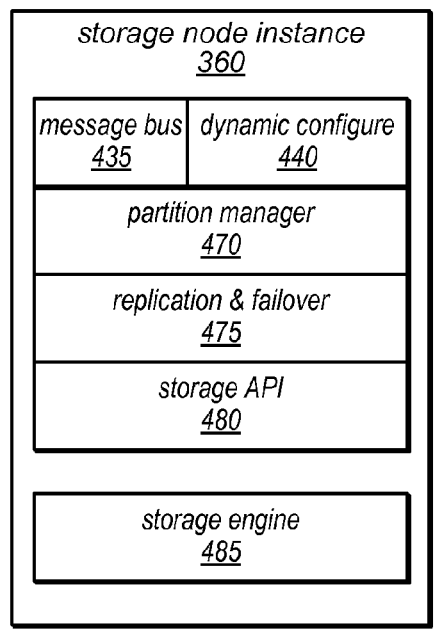

Please note that the illustration and accompanying description of FIG. 1 is not intended to be limiting as to various other arrangements or implementations of scheduling and tracking control plane operations for distributed storage systems. FIGS. 4A-4C, for example, provide a different arrangement of components/modules. As such, the previous examples are intended to be limiting.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 2 illustrates a block diagram of a system that provides various network-based services to clients, according to one embodiment. In this example, system 200 includes one or more clients 205. In this example, the client's 205 may be configured to interact with a network-based services platform 200 via a communication network 215.

As illustrated in this example, the network-based services platform 200 may be configured to process requests from clients 205 for various services, such as network-based service A (225), network-based service B (245), and network-based service C (255), and to return results to the clients 205. Network-based services platform 200 may also perform various accounting, metering, billing, or other administrative functions for the offered network-based services, such as logging client use of each service and generating a corresponding charger for an account associated with a particular customer. Each of the network-based services may provide clients with one or more of: computational resources, database services, data storage services (e.g., maintaining data in one or more tables on behalf of a client), or any other types of services or shared resources.

One embodiment of a system architecture that is configured to implement a network-based distributed storage service such as that described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as computing system 1000 in FIG. 8 described below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 310a-310n may encompass any type of client configurable to submit web services requests to network-based storage service 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with network-based storage service 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to network-based storage service 330 to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 330 may be coordinated by storage service client 310 and the operating system or file system on behalf of applications executing within the operating system environment.

Storage service clients 310 may convey web services requests to and receive responses from network-based storage service 330 via network 320. In various embodiments, network 320 may encompass any suitable combination of networking hardware and protocols necessary to establish web-based communications between clients 310 and network-based storage service 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and network-based storage service 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and network-based storage service 330. It is noted that in some embodiments, storage service clients 310 may communicate with network-based storage service 330 using a private network rather than the public Internet. For example, clients 310 may be provisioned within the same enterprise as the data storage service (and/or the underlying system) described herein. In such a case, clients 310 may communicate with network-based storage service 330 entirely through a private network 320 (e.g., a LAN or WAN that may use Internet-based communication protocols but which is not publicly accessible).

Generally speaking, network-based storage service 330 may be configured to implement one or more service endpoints configured to receive and process web services requests, such as requests to access tables maintained on behalf of clients/users by a database service or a data storage service, and/or the items and attributes stored in those tables. For example, network-based storage service 330 may include hardware and/or software configured to implement various service endpoints and to properly receive and process HTTP-based web services requests directed to those endpoints. In one embodiment, network-based storage service 330 may be implemented as a server system configured to receive web services requests from clients 310 and to forward them to various components that collectively implement a data storage system for processing. In other embodiments, network-based storage service 330 may be configured as a number of distinct systems (e.g., in a cluster topology) implementing load balancing and other request management features configured to dynamically manage large-scale web services request processing loads.

As illustrated in FIG. 3, network-based storage service 330 may include a front end module 340 (which may be configured to receive, authenticate, parse, throttle and/or dispatch service requests, among other things), one or more administrative components, or auto admin instances, 350 (which may be configured to provide a variety of visibility and/or control functions, as described in more detail herein), and a plurality of storage node instances (shown as 360a-360n), each of which may maintain and manage one or more tables on behalf of clients/users or on behalf of the data storage service (and its underlying system) itself. Some of the functionality provided by each of these types of components is described in more detail herein, according to various embodiments. Note that in some embodiments, network-based storage service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 330 may be configured to support different types of web services requests. For example, in some embodiments, network-based storage service 330 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 330 may implement various client management features. For example, service 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Network-based storage service 330 may also implement financial accounting and billing systems, or may maintain a database of usage data that may be queried and processed by external systems for reporting and billing of client usage activity. In some embodiments, network-based storage service 330 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A distributed storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

FIGS. 4A-4C illustrate various elements or modules that may be included in each of the types of components of network-based storage service 330, according to one embodiment. As illustrated in FIG. 4A, front end module 340 may include one or more modules configured to perform parsing and/or throttling of service requests (shown as 410), authentication and/or metering of service requests (shown as 415), dispatching service requests (shown as 425), and/or maintaining a partition map cache (shown as 430). In addition to these component-specific modules, front end module 340 may include components that are common to multiple types of computing nodes that collectively implement Web services platform 330, such as a message bus (shown as 435) and/or a dynamic configuration module (shown as 440). In other embodiments, more, fewer, or different elements may be included in front end module 340, or any of the elements illustrated as being included in front end module 340 may be included in another component of network-based storage service 330 or in a component configured to interact with network-based storage service 330 to provide the data storage services described herein.

As illustrated in FIG. 4B, auto admin instance 350 may include one or more modules configured to provide visibility and control to system administrators (shown as 445), or to perform heat balancing (shown as 450), and/or anomaly control (shown as 455), resource allocation (shown as 460). In some embodiments, resource allocation module 460, heat balancing module 450, anomaly control module 455, control plane event registry 120, control plane task scheduler 130, control plane task handler(s) 150, and/or sweeper module(s) 462, may be configured to work separately or in combination to perform scheduling and tracking of control plane events, as described in more detail below. Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated.

Auto admin instance 350 may include, in some embodiments control plane event registry 120. As noted above, control plane event registry 120 may provide an interface or access to information stored about one or more detected control plane events at distributed storage system 110. In at least some embodiments, control plane event registry 120 may be implemented to interface with a table or data object that can be changed, updated or written to by other modules of auto admin instance 350, such as sweeper modules 462 or control plane task handlers 150. For example, in some embodiments control plane event data may be stored on a database table that is accessible via control plane event registry 120. In at least some embodiments, other service systems, nodes, devices, instances, etc. may send registration messages for detected control plane events, updates, or some other form of request to auto admin instance 350 for storage in event registry 120.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the operation type or the resources to be utilized may be included.

Control plane event registry 120 may be configured, in some embodiments, to provide access to entries for each detected event. Subsequent operations performed in response to the control plane event, metadata describing or associated with the control plane event, and the current state of the control plane event may be maintained in the respective entry for the detected control plane event. Control plane event registry 120 may also maintain event trigger information, such as whether a particular event was triggered internal or external to network-based storage service 330. For each detected control plane event, control plane event registry 120 may maintain information about one or more control plane operations to be performed in response to or in accordance with the detected event. For example, different control plane operations to be performed may be one of different operation types. In at least some embodiments multiple different control plane operations of different operation types may be performed in response to a single detected control plane event. For example, a split or move control plane event, may trigger the performance of split or move control plane operations, as well as a delete table control plane operation to remove an obsolete table. Various different operation types are discussed in further detail below with regard to task handlers 150.

Auto admin instance 350 may include, in various embodiments, control plane task scheduler 130. Task scheduler 130 may determine the current resource utilization of the distributed storage service 330. Current resource utilization may include currently performing control plane operations as well as scheduled control plane operations. The types of resources analyzed may generally be any resource with which a control plane operation may be performed. For instance, if a particular type of node, such as a storage node, is utilized for a control plane operation, then the resource utilization of that particular node may be evaluated. Performance characteristics, such as currently stored data, available storage, number current operations, computing power/load, etc., may be used to determine the utilization of the resource. In some embodiments, task handlers, such as control plane task handlers 150, may be evaluated to determine their ability/capacity to perform control plane operations. If task handlers for a particular type of control plane operation may only perform a limited number control plane operations at any given time, then the number of currently performing, or scheduled to perform operations for a control plane task handler may be evaluated.

Control plane task scheduler 130 may, in various embodiments (as discussed above) analyze information about the detected control plane events to schedule one or more control plane events to be performed. Various different prioritization schemes or analyses may be performed to schedule control plane operations. In at least some embodiments, one or more resource constraints may be applied to the current resource utilization determined for distributed storage service 330. Resource constraints may generally be any limitations or other form of constraint for performing the control plane operations corresponding to the detected control plane events. For example, in some embodiments, resource constraints may limit the numbers or sizes of different operation types that may be concurrently performed (e.g., overlapping performance), such as an operation type throttle that limits the number of control plane operations of the same type performed concurrently. Move operations, for instance, may be limited to specified number of slots or task handlers configured to perform the move operations. Different operation types may have different resource constraints. For example, 20 update table operations may be performed concurrently while only 5 split operations may be performed concurrently. In some embodiments, different resource constraints for different operation types may be determined based on the event source, whether internally or externally triggered (e.g., sometimes, usually, or exclusively triggered by one source or another).

Another form of resource constraint that control plane task scheduler 130 may consider is resource conflict limitations between operations. For example, when one control plane operation utilizes the same resource as another, such as a node used as a source for an add replica operation and a destination for a move operation, then a resource conflict arises. The number of resource conflicts on a particular resource may be limited, or in some embodiments, completely avoided. In various embodiments, resource conflicts may be determined by the number of import and/or export tasks a particular node is performing. Various thresholds may be applied limiting the number of imports and/or exports of a given node. In addition to resource constraints such as concurrent limits or operation resource conflicts, various other resource constraints may be accounted for when scheduling control plane operations, including, but not limited to, network traffic, computational cost, and/or service level agreements stipulating the performance of certain operations and/or resources.

Figure 6:
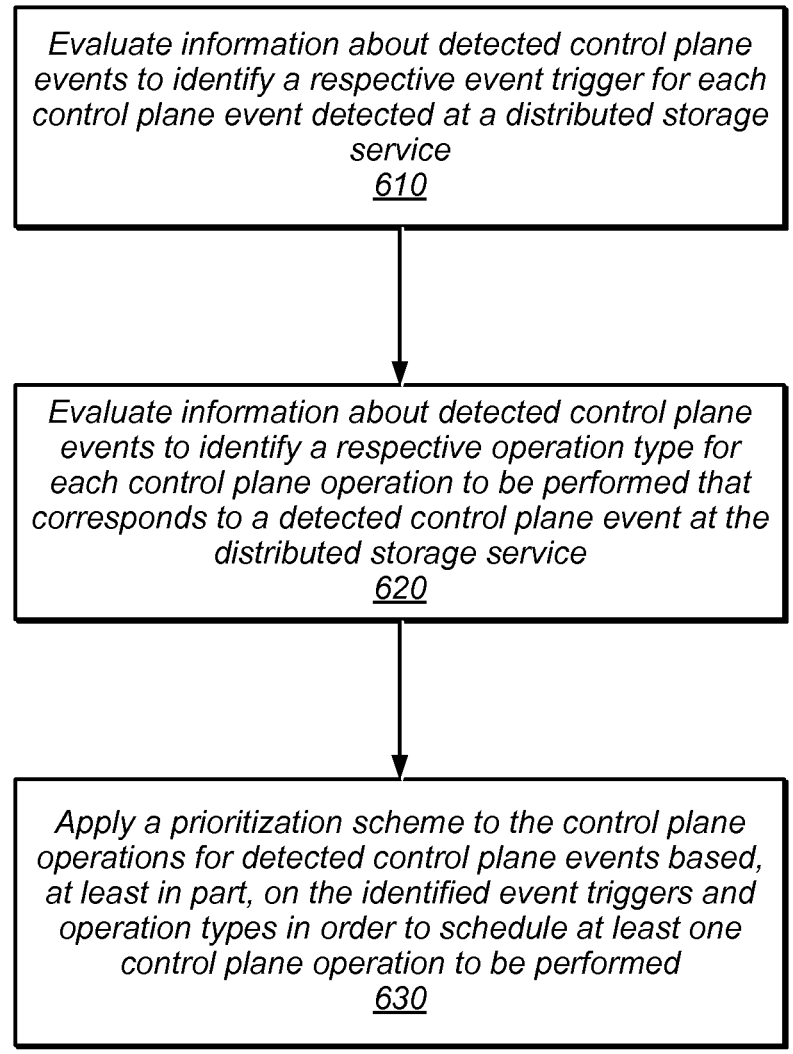
FIG. 6 is a high-level flowchart of a method to prioritize control plane operations based on the respective triggering event and the respective operation type for triggered events, according to some embodiments.

As noted above, control plane task scheduler 130 may also apply one or more prioritization schemes, in different combinations, in addition to the resource constraints described above, to control plane operations for detected events. FIG. 6 provides further detail below on the various techniques that may be implemented to prioritize control plane operations based on event trigger (e.g., internal, external) and/or operation type. Control plane task scheduler 130 may perform control plane operation scheduling dynamically, or at other various periodic or aperiodic intervals. For example, control plane operation scheduling may be performed when a certain number of new event registration messages are received, or when control plane events with control plane operations of a certain type are received (e.g., a reboot operation). Various data structures or other indexing schemes may be implemented by control plane task scheduler 130 to maintain or update the schedule of control plane operations, or to provide an indication of priority applied to control plane operations, such as by assigning various priority numbers, or by location in a particular data structure, such as a priority queue.

Auto admin instance 350 may also include one or more control plane task handlers 150. As noted above, in some embodiments, multiple instances of auto-admin 350 may be implemented with one instance performing the control plane task scheduling function, and other deputy instances implementing the various task handlers. However, in some embodiments a single auto-admin instance may be configured to perform both task scheduling and implement the tasks handlers to perform the scheduled control plane event operations.

Control plane task handlers 150 may be configured to direct the performance of different types of control plane operations among the nodes, systems, or devices implementing network-based storage service 330. For instance, task handlers 150 may be configured to communicate with master nodes of clusters of storage nodes to initiate the performance of various control plane operations, such as moves, splits, update tables, delete tables, etc. . . . . Task handlers may also be configured to update event registry (or some other table or data structure) with the status, state, or performance information of the tasks currently being performed. For example, for each child operation or subtask of a control plane operation, an update may be sent to update a respective entry in the record of the detected event to which the operation corresponds. Similarly, if a control plane operation involves multiple decision points, updates may include the various decisions taken, and may also include the various results, factors that informed such decisions. Control plane task handlers 150 may also provide updates indicating the resources that are currently utilized to perform the control plane operation, such as the particular replica, data, node, system, or device. Control plane task scheduler 130 may consider this utilization information when scheduling control plane operations. In some embodiments, the status or progress information of multiple different incomplete or currently performing control plane operations may be considered by control plane task scheduler 130 when scheduling or directing the completion of control plane event operations.

In various embodiments, at least one of control plane task handlers 150 may be configured to perform an add replica operation type. A replica may be a copy, representation, or portion of data maintained as part of a replica group maintained across different storage nodes for the data maintained at a distributed storage service. An add replica operation may perform various sub-tasks or child operations, such as selecting resources to perform the add replica (e.g., a source node from which to obtain a data replica and destination node for the new replica), instructing the preparation of data for transport, and/or directing the transportation of data. Upon completion or initiation of these or various other steps for performing an add replica operation, task handler 150 may be configured to send/write updates to event registry 120 for the detected event. In at least some embodiments, an add replica event in which an add replica operation may be performed may be triggered internally. For example, sweeper module 462 may detect that a replica group does not maintain a sufficient number of healthy/available replicas, and register an add replica event at event registry 120. Alternatively, an add replica event may be triggered externally.

In various embodiments, at least one of control plane task handlers 150 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. Alternatively, one or more internal maintenance operations, such as sweeper modules 462 may trigger an update table operation.

In various embodiments, at least one of control plane task handlers 150 may be configured to perform a split operation type. For instance, in some embodiments, a partition of data may be assigned to a particular storage node based largely (or solely) on whether there is enough storage capacity for the anticipated size of the table. In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some or all of these cases, the partition may need to be split into two new (smaller) partitions, each of which may be hosted on a different storage device (or storage node). A split operation may perform various sub-tasks child operations. For example, if a partition is split, each of the replicas in a replica group for the partition may also be split. Upon completion or initiation of these or various other steps for performing a split operation, control plane task handler 150 may be configured to send/write updates to control plane event registry 120 for the detected control plane event. A split event may be triggered internally, as part of performing another operation (as noted above by increasing the provisioned throughput capacity) or maintenance task.

In various embodiments, at least one of control plane task handlers 150 may be configured to perform a move operation type. A move operation type may move a replica of data to another storage node (or storage device). A move operation may perform various sub-tasks or child operations. Upon completion or initiation of these or various other steps for performing a move operation, control plane task handler 150 may be configured to send/write updates to control plane event registry 120 for the detected event. Similar to a split operation discussed above, the move operation may be triggered internally, as part of performing another operation or a maintenance task.

In various embodiments, at least one of control plane task handlers 150 may be configured to perform a delete table operation type. A delete table operation may delete a table and the table's items. A delete table operation may perform various sub-tasks or child operations. Upon completion or initiation of these or various other steps for performing a delete table operation, control plane task handler 150 may be configured to send/write updates to control plane event registry 120 for the detected event. A delete table operation may be performed in response to detecting a delete table event. A delete table event may be triggered internally, such as part of one or more maintenance tasks (e.g., a sweeper module 462 that detects stuck or incomplete delete operations) or other operations (e.g., as a result of move or split operations). A delete table event may also be triggered externally, such as by an API request from a client.

In various embodiments, at least one of control plane task handlers 150 may be configured to perform a create table operation type. A create table operation may create a table for storing items in the network-based distributed storage service 330. A create table operation may perform various sub-tasks or child operations. Upon completion or initiation of these or various other steps for performing a create table operation, control plane task handler 150 may be configured to send/write updates to control plane event registry 120 for the detected event. A create table event may be triggered externally, such as by an API request from a client.

In various embodiments, at least one of control plane task handlers 150 may be configured to perform a reboot operation type. A reboot operation may instruct a particular system, node, module, instance, or process (e.g., a process servicing a particular partition) to restart operations. A reboot operation may perform various sub-tasks or child operations. Upon completion or initiation of these or various other steps for performing a reboot operation, control plane task handler 150 may be configured to send/write updates to event registry 120 for the detected event. A reboot operation may be performed in response to detecting a reboot event. A reboot event may be triggered internally, such as part of one or more maintenance tasks (e.g., a sweeper module 462 that detects unhealthy or unresponsive nodes).

In addition to these component-specific modules, auto admin instance 350 may also include components that are common to the different types of computing nodes that collectively network-based storage service 330, such as a message bus (shown as 435) and/or a dynamic configuration module (shown as 440). In other embodiments, more, fewer, or different elements may be included in auto admin instance 350, or any of the elements illustrated as being included in auto admin instance 350 may be included in another component of network-based storage service 330 or in a component configured to interact with network-based storage service 330 to provide the data storage services described herein.

As illustrated in FIG. 4C, storage node instance 360 may include one or more modules configured to provide partition management (shown as 470), to implement replication and failover processes (shown as 475), and/or to provide an application programming interface (API) to underlying storage (shown as 480). In some embodiments, the partition manager 470 (or another component of storage node instance 360) may be configured to detect one or more control plane events and send a control plane event registration message to control plane event registry 120. Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 485, which may be configured to maintain (i.e. to store and manage) one or more tables (and associated table data) in storage 480 (which in some embodiments may be a non-relational database) on behalf of one or more clients/users. In addition to these component-specific modules, storage node instance 360 may include components that are common to the different types of computing nodes that collectively implement Network-based storage service 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of network-based storage service 330 or in a component configured to interact with network-based storage service 330 to provide the data storage services described herein.

Note that in some embodiments, it may not be necessary to perform some or all of the throttling, authentication, and/or metering operations that would typically be provided by front end module 340 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 350 (e.g., heat balancing and/or resource allocation) may or may not be applied in managing tables in a single-tenant environment. However, other operations illustrated as being performed by auto admin instance 350 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables (e.g., in response to the findings presented in a skew report). These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

Figure 5:
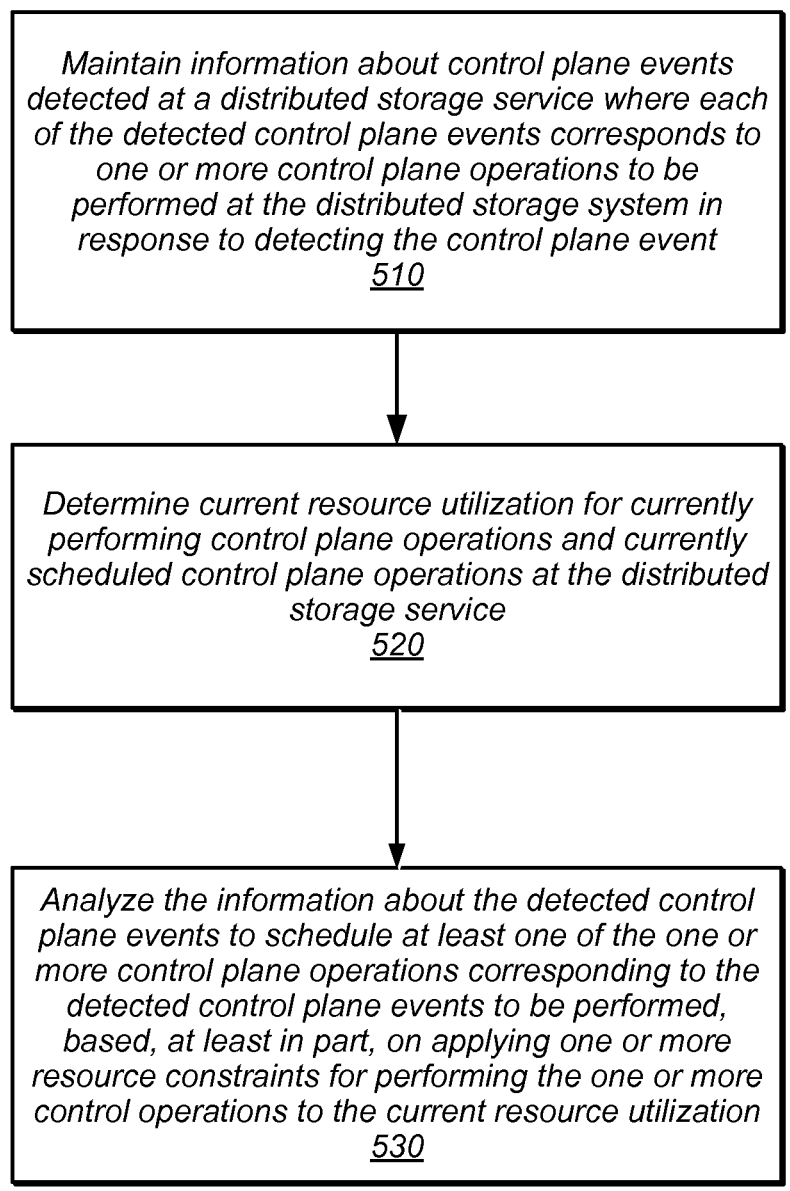
FIG. 5 is a high-level flowchart of a method to schedule control plane operations for a distributed storage system, according to some embodiments.

Distributed systems, such as distributed storage systems or services described above with regard to FIGS. 2-4, often perform diverse actions, from responding to requests, such as client requests, or performing maintenance or other operations to support or provide services of the distributed system. In many embodiments, a control plane or some other global-view control system or module may be implemented to coordinate the performance of system operations among the devices, systems, or nodes of the distributed system. Control plane events are sometimes received, detected, or generated such that corresponding control plane operations may be performed in response to or in accordance with the detected control plane event. FIG. 5 is a high-level flowchart of a method to schedule performance of control plane operations for a distributed storage service, according to some embodiments.

In various embodiments, information about control plane events detected at a distributed storage system may be maintained, as indicated at 510. This information may be maintained as part of some data store (e.g., in a persistent storage device) in a variety of different formats or data structures (e.g., tables, lists, objects, etc. . . . ). In some embodiments, the information may be accessed, written to or read from, via an interface such as control plane event registry 120 described above with regard to FIGS. 1 and 4B. The information itself may generally describe any information related to the detected control plane events. For example, in some embodiments, entries for each detected control plane event may describe the current state of the detected control plane event (e.g., whether the corresponding control plane operation(s) for the detected control plane event have been scheduled). Such event state descriptors may include, but are not limited to, "pending," "active," "failed," "cancelled," or "done." The information may also include listings of control plane operations or other tasks to be performed in response to the detected control plane event. For example, if a replica group (a group of storage nodes maintaining replicas of a partition of data table, or some other data object) is determined to be sub-par (that is an unhealthy or insufficiently available number of replicas), then an add replica operation may be listed or associated with the entry for the detected sub-par control plane event.

Other common information maintained for detected control plane events may be the event trigger and the corresponding control plane operation type, in some embodiments. An event trigger, as discussed above, may be internal or external to a distributed storage system. Externally triggered events, such as those triggered by client requests, may include information about the external trigger (e.g., which client, what operation, what time the request was received, etc. . . . ). Internally triggered events, such as those triggered by internal operations or functions of the distributed storage system (e.g., maintenance, storage nodes, various other system modules or components) may also include information about the internal trigger. If, for example, a system maintenance module (e.g., sweeper module 462 described above with regard to FIG. 4B) detects that a particular node is not responding to requests and needs to rebooted, the information may include the time of detection, the unresponsive node, and/or any other information necessary to perform the corresponding control plane operation(s).

Operation types for control plane operations may also be included. Various control plane operation types were discussed above with regard to control plane task handlers 150 in FIGS. 1 and 4B. In some embodiments, these operation types may include, but are not limited to, reboot operations, split or partition operations, move operations, add replica operations, create table operations, delete table operations, and/or update table operations. Information associated with performing these example operations, and other operation types, may be also included. For instance, source and target locations for move or split operations, or new target throughput rates for provisioning resources for update table operations.

In at least some embodiments, current resource utilization for currently performing control plane operations and currently scheduled control plane operations at the distributed storage system may be determined, as indicated at 520. As discussed above with regard to FIGS. 1 and 4, a distributed system includes many different systems, components, devices, modules, or nodes, each of which may be performing different operations and/or maintaining different resources, arranged in different logical or physical groupings. Current resource utilization may be determined to include the performance, capacity, and other capability information for the components of a distributed storage system to perform control plane operations. Examples of such include, but are not limited to, storage availability, computational capacity, network/transport capacity, or current state of the component (e.g., in reboot, update, repair mode, etc. . . . ). As part of the current resource utilization, the currently performing and currently scheduled control plane operations may be accounted for in current resource utilization, in various embodiments. For example, if 10 split operations are currently performing and 2 more split operations are already scheduled to perform, the current resource utilization for the distributed storage system may identify the capability of the distributed storage system to schedule additional split operations based on the 10 performing and 2 scheduled split operations. For instance, if the distributed storage system comprises a limited number of slots to perform split operations, such as 12, then no more split operations may be scheduled until one or more split operations complete.

Information about the detected control plane events may then be analyzed to schedule at least one control plane operation to be performed, as indicated at 530. In at least some embodiments, analysis and scheduling of control plane operations may be based, at least in part, on applying one or more resource constraints to the determined current resource utilization for the distributed storage system. For instance, in some embodiments, resource constraints may be a limitation on number of concurrent operations, either generally, or operations of a specific type, such as an operation type throttle. There may be, for example, only 10 slots for performing delete operations at any given time. Similarly, individual resources may have limitations for performing certain operations. A particular cluster of nodes implementing a replica group for maintaining replicas of data may be limited to performing only one split operation at a time. Likewise, a particular node or system may only be configured handle a certain number of concurrent operations at a time. Thus, determining conflicts between resources, and in various embodiments, avoiding or limiting conflicts of resource utilization between resources may also be accounted for when generating an ordering of operations. Different resources or operations may have different resource constraints. Thus in the above example, delete operations may have 10 slots for performing, but move operations may have 20 slots. In some embodiments, control plane operations identified as critical or some other high-priority designation may be subject to fewer resource constraints.

A prioritization scheme may also be applied when scheduling control plane operations, which may weight higher performance of control plane operations corresponding to detected control plane events of certain operation types or detected events of a particular event trigger. FIG. 6 is a high-level flowchart of a method to prioritize control plane operations based on the respective triggering event and the respective operation type for triggered events, according to some embodiments.

As indicated at 610, the information about detected control plane events may be evaluated to identify a respective event trigger for each control plane event detected at a distributed storage system, in some embodiments. This information may be simply listed in a control plane event registry, or further analysis or classification (e.g., the various classifications discussed above with regard to FIG. 1) of respective triggers such as whether the trigger is based on a client request, who the requesting client is (a client or another network-based service as illustrated in FIG. 2) may be examined to further define the event trigger. In some embodiments, information about detected control plane events may be evaluated to identify a respective control plane operation type for each control plane operation, as indicated at 620. These control plane operation types, as noted above, may cover a variety of different control plane operations.

A prioritization scheme may be applied to control plane operations for detected control plane events, as indicated at 630. In various embodiments, this prioritization scheme may be based, at least in part, on the identified event triggers and/or operation types of the control plane operations in order to schedule the control plane operation. Control pane event triggers and operation types may be analyzed individually or cumulatively to prioritize control plane. For example, in some embodiments, operation type may be a primary consideration when scheduling control plane operations. Consider the scenario where a reboot operation, a move operation, a split operation, and an update table operation are being examined. A priority scheme may identify a reboot operation as high-priority and schedule the reboot operation prior to scheduling other control plane operations. Similarly, move and split operations may be considered higher priority operations than update table operations, and thus be scheduled ahead of the update table operation. In the same way, event trigger may also be applied to control plane operations. If, using this example, the update table operation is in response to a client request to update the table, then it may have a higher priority than the other control plane operations, which may have internal triggers.

Various combinations of event trigger and operation type priority schemes may be applied, such as using one factor to tie-break or prioritize operations with similar priority according to the first factor. Thus, in some embodiments, at least some control plane operations of the same operation type may be scheduled ahead of other control plane operations of the same type, and/or similarly, at least some control plane operations with may be scheduled ahead of other control plane operations with similar (or the same) triggers. Consider the scenario where two move operations are evaluated. Both have the same operation type and a priority scheme applied based on operation type may give them a relatively similar priority. However, if one move operation is internally triggered, and one is externally triggered, then applying the prioritization scheme to event trigger may result in the priority of the externally trigger move operation being scheduled ahead of the internally triggered move operation. Various other information for determining priority and scheduling may also be consider in these prioritization schemes. Timestamps, performance costs, or any other factors may be used to further refine or be considered a part of applying prioritization schemes. As a result, the previous examples are not intended to be limiting.

The various methods and techniques described above with regard to FIGS. 5 and 6 may be performed at various intervals, such as after a certain amount of time has passed since a priori scheduling. Scheduling of control plane operations may also be performed dynamically. For instance, scheduling may occur when a certain number of unscheduled control plane operations are recorded/registered with a control plane event registry.

Figure 7:
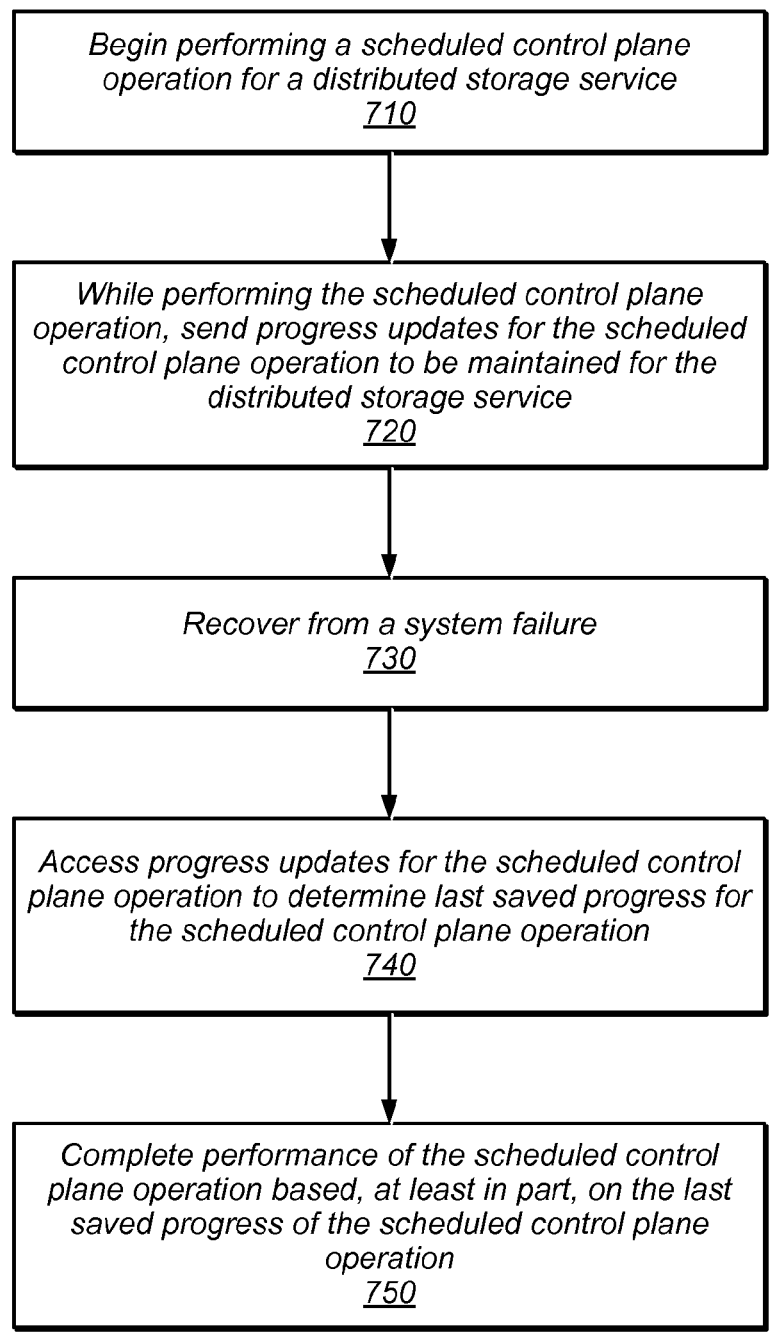
FIG. 7 is a high-level flowchart of a method to restart incomplete operations based on progress tracking information maintained for performing control plane operations, according to some embodiments.

Scheduled control plane operations may be performed at a distributed system. In various embodiments, different task handlers, such as task handlers 150 described above with regard to FIG. 1, may be implemented to perform the various tasks. Inevitably, some scheduled control plane operations may stall, abort, or otherwise fail to complete. FIG. 7 is a high-level flowchart of a method to restart incomplete operations based on progress tracking information maintained for performing control plane operations, according to some embodiments.

As indicated at 710, a control plane operation may begin performing at the distributed storage system. While performing the control plane operation, progress updates for the control plane operation may be sent to be maintained for the distributed storage system, as indicated at 720. These updates may be sent to a control plane operation status tracker, data store, or some other module or component, such as control plane event registry 120 described above with regard to FIG. 1. Progress information may include any information about complete steps, tasks, resources, decisions, or changes made by a control plane operation. For example, progress updates (or status updates) may indicate which portions of a data object have been transported to a new node during a move operation, or determinations made as to whether a particular resource should be modified, moved, etc. . . . . . At some point during the performance of the control plane operation, the system or the operation may fail. This failure may be due to a system failure, or the individual thread or process performing the operation may fail to complete.

Recovery from the system failure may occur, as indicated at 730. Please note that recovery and subsequent performance of the incomplete control operation may occur on the same or different node, system, module or device. Incomplete control plane operations may be identified. For example, a sweeper module or task scheduler 130 in FIG. 1 may evaluate control plane event registry to determine whether the state of a control plane event is active, yet not being performed. For those control operations identified as incomplete, progress updates for the scheduled control operation may be accessed to determine last saved progress for the scheduled control plane operation, as indicated at 740. For instance, the last complete step, element, or last transferred file or data may be indicated. Based, at least in part, on the determined last saved progress of the current scheduled operation, in some embodiments, the incomplete control plane operation may complete performance, as indicated at 750. Thus for instance, the remaining steps or elements may be performed, or the remaining files transferred.

The previous flowcharts illustrate just some of the various methods and techniques that may be implemented to schedule and track event operations for a distributed storage system, and are not intended to be limiting. Various other elements or orderings of elements may be performed in addition to or instead of those depicted.

Figure 8:
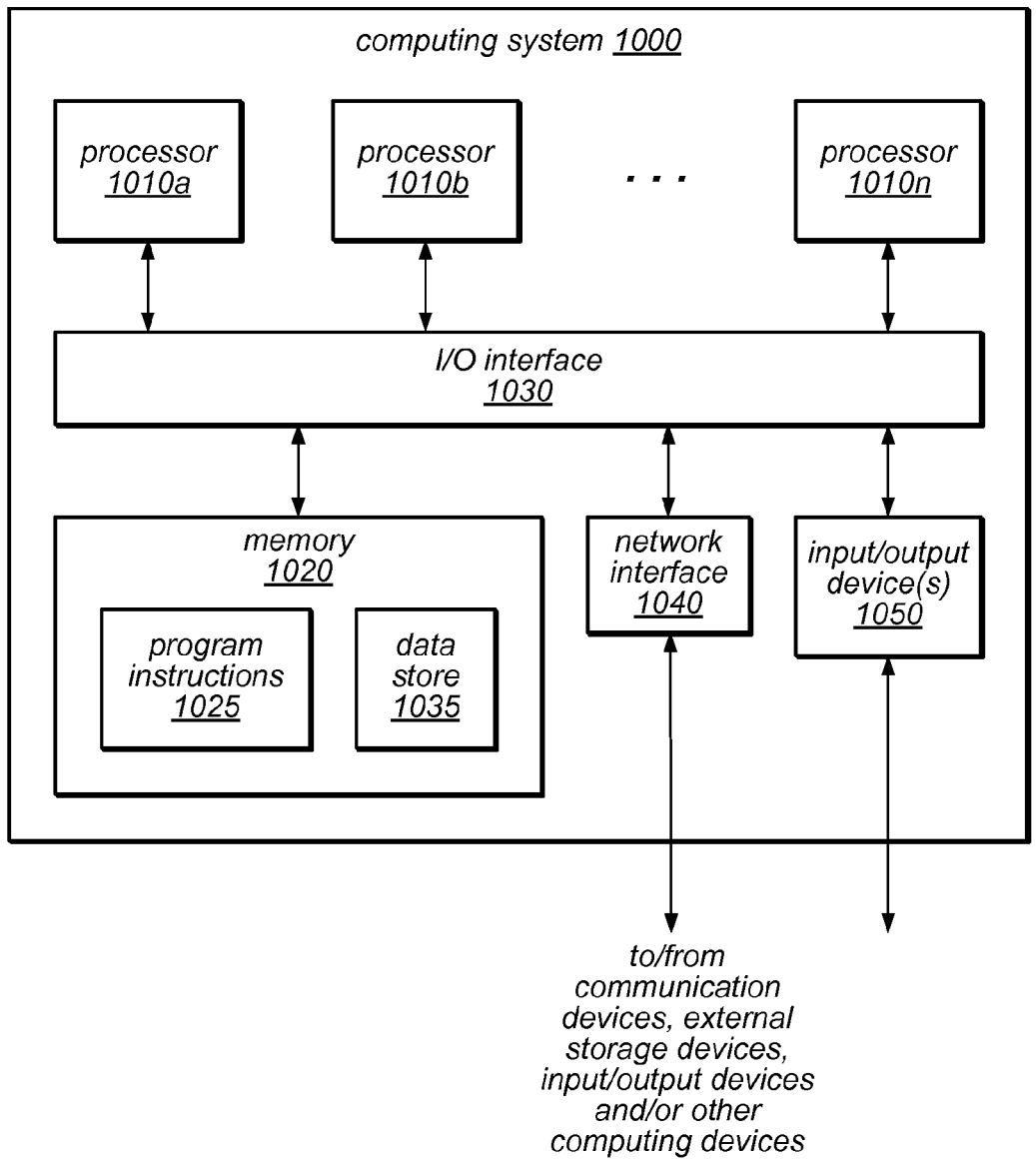
FIG. 8 is a block diagram illustrating an example computing system, according to some embodiments.

Embodiments of scheduling and tracking event operations for distributed storage systems as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various embodiments of scheduling and tracking event operations for distributed storage systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  a plurality of compute nodes implementing a distributed storage service, wherein the distributed storage service comprises:
    a plurality of task handlers, configured to perform a plurality of operations for the distributed storage service;
    a control plane event registry, configured to:
      receive a plurality of control plane event registrations from one or more of the plurality of compute nodes, wherein each control plane event registration indicates the detection of a control plane event at the distributed storage service, wherein each detected control plane event corresponds to one or more of the plurality of control plane operations which are to be performed in response to detecting the control plane event; and store information about the detected control plane events indicated by the plurality of control plane event registrations; and
a control plane task scheduler, configured to:
determine current resource utilization for currently performing control plane operations and currently scheduled control plane operations of the distributed storage service;
analyze the information about the detected control plane events to schedule at least one of the one or more control plane operations corresponding to the detected control plane events to be performed, based, at least in part, on applying one or more resource constraints for performing the one or more control plane operations to the determined current resource utilization; and
direct at least one task handler of the plurality of task handlers to perform the scheduled at least one control operation.

2. The system of claim 1, wherein the information about the detected control plane events indicated by the plurality of control plane event registrations comprises an event trigger for each of the detected control plane events, and wherein, to analyze the information about the detected control plane events to schedule at least one of the one or more control plane operations corresponding to the detected control plane events to be performed, the storage service task scheduler is configured to:
based, at least in part, on the event trigger for each of the detected control plane events:
determine that at least some of the detected control plane events are externally triggered events;
determine that at least some other ones of the detected control plane events are internally triggered events; and
apply a prioritization scheme to the one or more control plane operations to be performed to prioritize performance of control plane operations for at least some of the externally triggered events ahead of control plane operations for at least some of the internally triggered events.

3. The system of claim 1, wherein the information about the detected control plane events indicated by the plurality of control plane event registrations comprises an operation type for each of the one or more control plane operations to be performed, and wherein to analyze the information about the detected control plane events to schedule at least one of the one or more control plane operations corresponding to the detected control plane events to be performed, the storage service task scheduler is configured to:
apply a prioritization scheme to the one or more control plane operations to be performed based, at least in part, on the operation type for each the one or more control plane operations to be performed.

4. The system of claim 1, further comprising:
wherein the at least one task handler is configured to:
provide operation status updates for the duration of the performance of the at least one scheduled control plane operation to be maintained;
wherein the storage service task scheduler is further configured to:
upon recovery from a system failure:
evaluate the operation status updates to identify at least one incomplete control operation; and
direct at least one of the plurality of task handlers to perform the at least one incomplete control plane operation based, at least in part, on a most recently received operation status update for the at least one incomplete control operation.

5. A method, comprising:
performing, by one or more computing devices:
maintaining information about a plurality of control plane events detected at a distributed storage service, wherein each of the plurality of detected control plane events corresponds to one or more control plane operations to be performed at the distributed storage system in response to detecting the control plane event;
determine current resource utilization for currently performing control plane operations and currently scheduled control plane operations at the distributed storage service; and
analyzing the information about the detected control plane events to schedule at least one of the one or more control plane operations corresponding to the detected control plane events to be performed, based, at least in part, on applying one or more resource constraints for performing the one or more control plane operations to the determined current resource utilization for the distributed storage service.

6. The method of claim 5, wherein the information for each of the plurality of detected control plane events comprises an event trigger for the respective detected control plane event, and wherein said analyzing the information about the detected control plane events to schedule at least one of the one or more control plane operations corresponding to the detected control plane events to be performed, comprises prioritizing the one or more control plane operations corresponding to the detected control plane events according to the respective event trigger for each of the detected events.

7. The method of claim 6, wherein said prioritizing the one or more control plane operations corresponding to the detected control plane events according to the respective event trigger for each of the detected control plane events, comprises:
determining that at least some of the detected control plane events are events triggered by one or more client requests received at the distributed storage service;
determining that at least some other ones of the detected control plane events are events triggered by one or more internal requests received from one or more of the one or more computing devices implementing the distributed storage service; and
applying a prioritization scheme to the one or more control plane operations corresponding to the detected control plane events in order to prioritize performance of control plane operations for at least some of the control plane events triggered by the one or more client requests ahead of control plane operations for at least some of the control plane events triggered by the one or more internal requests.

8. The method of claim 5, wherein said analyzing the information about the detected control plane events to schedule at least one of the one or more control plane operations corresponding to the detected control plane events to be performed comprises:
identifying one or more possible performance conflicts among the one or more control plane operations corresponding to the detected control plane events; and
ordering the one or more control plane operations corresponding to the detected control plane events to avoid the one or more possible performance conflicts.

9. The method of claim 5, wherein the information comprises an operation type for each control plane operation corresponding to the detected control plane events, wherein the operation type for at least some of the control plane operations corresponding to the detected plane events is different than the operation type for other ones of the control plane operations corresponding to the detected control plane events, and wherein analyzing the information about the detected control plane events to schedule at least one of the one or more control plane operations corresponding to the detected control plane events to be performed comprises prioritizing the one or more control plane operations corresponding to the detected control plane events according to the respective operation type for each of the one or more control plane operations corresponding to the detected control events.

10. The method of claim 9, wherein the determined one or more resource constraints for performing the one or more control plane operations corresponding to the detected control plane events comprises different resource constraints for different operation types.

11. The method of claim 9, wherein at least one of the one or more resource constraints applied to the current resource utilization is an operation type throttle, wherein the operation type throttle limits a particular number of control plane operations currently performed of a same operation type.

12. The method of claim 5, further comprising:
performing the scheduled at least one control operation; and
while performing the scheduled at least one control operation, maintaining progress information for the scheduled at least one control operation.

13. The method of claim 12, further comprising:
upon recovery from a system failure, wherein the scheduled at least one control plane operation fails to complete:
based, at least in part, on the progress information for the scheduled at least one control operation, completing performance of the scheduled at least one control operation.

14. A non-transitory, computer-readable storage medium, storing program instructions that when executed by one or more computing devices cause the one or more computing devices to implement a control plane task engine configured to direct the performance of control plane operations among one or more of nodes implementing a distributed storage service, wherein the task engine implements:
maintaining information about a plurality of control plane events detected at the distributed storage service, wherein each of the plurality of detected control plane events corresponds to one or more control plane operations to be performed at the distributed storage service in response to detecting the event;
determine current resource utilization for currently performing control plane operations and currently scheduled control plane operations at the distributed storage service; and
analyzing the information about the detected control plane events to schedule at least one of the one or more control plane operations corresponding to the detected control plane events to be performed, based, at least in part, on applying one or more resource constraints for performing the one or more control plane operations to the determined current resource utilization for the distributed storage service.

15. The non-transitory, computer-readable storage medium of claim 14, wherein the information for each of the plurality of detected control plane events comprises an event trigger for the respective detected control plane event and an operation type for each of the one or more control plane operations corresponding to the respective detected control plane event, wherein the event trigger or the operation type of the one or more corresponding control plane operations for at least some of the plurality of detected control plane events differs from at least some other ones of the plurality of detected control plane events in their respective event trigger or operation type of the one or more corresponding control plane operations, and wherein, in said analyzing the information about the detected control plane events to schedule at least one of the one or more control plane operations corresponding to the detected control plane events to be performed, the task engine further implements applying a prioritization scheme to the one or more control plane operations corresponding to the detected control plane events based, at least in part, on the respective event trigger and the operation type for the one or more corresponding control plane operations for each of the detected control plane events.

16. The non-transitory, computer-readable storage medium of claim 15, wherein at least one of the one or more resource constraints applied to the current resource utilization is an operation type throttle, wherein the operation type throttle limits a particular number of control plane operations currently performed of a same operation type.

17. The non-transitory, computer-readable storage medium of claim 15, wherein operation types for the detected control plane events comprise one or more of:
a reboot operation;
a split operation;
a move operation;
an add replica operation;
a create table operation;
a delete table operation; or
an update table operation.

18. The non-transitory, computer-readable storage medium of claim 15, wherein the event triggers for the detected control plane events comprise one or more of:
an externally triggered event; or
an internally triggered event.

19. The non-transitory, computer-readable storage medium of claim 18, wherein a control plane operation corresponding to at least one detected control plane event has the same operation type as another control plane operation corresponding to another one of the detected control plane events, wherein the event trigger for the at least one detected event is an externally triggered event and the at least one other detected event is an internally triggered event, and wherein, in said applying the prioritization scheme to the one or more control plane operations corresponding to the detected control plane events, the control plane operation corresponding to the internally triggered event is scheduled to be performed prior to the other control plane operation corresponding to the externally triggered event.

20. The non-transitory, computer-readable storage medium of claim 14, wherein the task engine further implements:
directing the performance of the scheduled at least one control operation; and
during the performance of the scheduled at least one control operation, receiving one or more status updates to be maintained for the duration of the performance of the at least one control operation.

21. The non-transitory, computer-readable storage medium of claim 20, wherein the one or more status updates to be maintained comprise information about resources utilized to perform the at least one control operation.

22. The non-transitory, computer-readable storage medium of claim 20, wherein the task engine further implements:
  upon recovery from a system failure, wherein the scheduled at least one control plane operation fails to complete:
    based, at least in part, on the one or more status updates for the scheduled at least one control operation, determining last saved progress for the scheduled at least one control operation; and
    directing the completion of the scheduled at least one control plane operation based, at least in part, on the last saved progress for the scheduled at least one control operation.

\* \* \* \* \*